Patented July 14, 1931

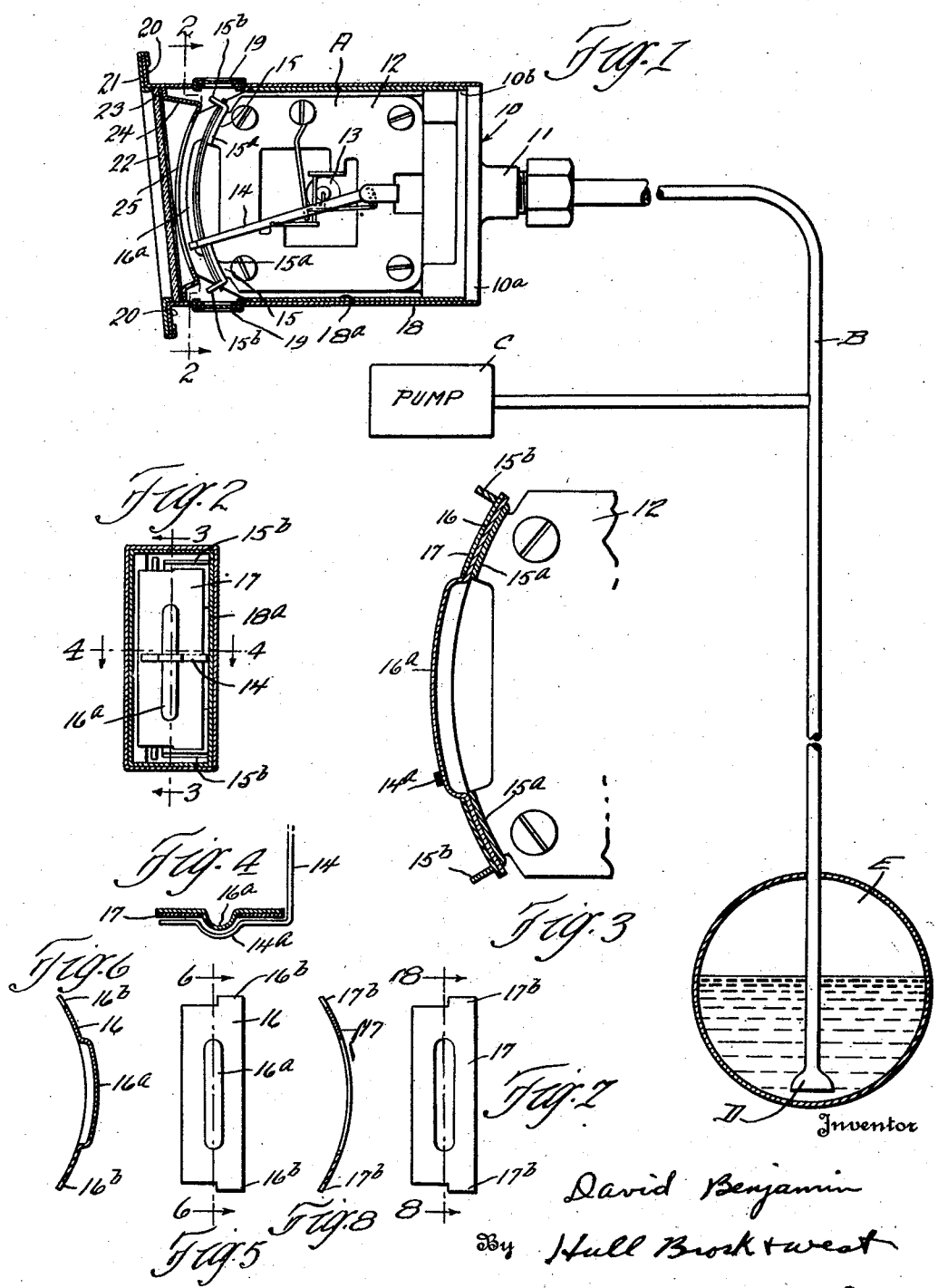

1,815,004

UNITED STATES PATENT OFFICE

DAVID BENJAMIN, OF CLEVELAND HEIGHTS, OHIO, ASSIGNOR TO THE GABRIEL COMPANY, OF CLEVELAND, OHIO, A CORPORATION OF OHIO

INDICATOR

Application filed July 21, 1930. Serial No. 469,619.

This invention relates to improvements in recording gauges and has for its principal object the improvement in the dial or dial plate of such gauges with which a pointer cooperates for the purpose of making a visual record. While capable of other uses, the gauge shown herein is employed for the purpose of indicating the height of a liquid which it is desired to measure.

In the drawings Fig. 1 is a schematic layout of the system the casing and the parts therein being shown in section with the exception of the casting and the indicating mechanism which are shown in elevation; Fig. 2 is a section on the line 2—2 of Fig. 1; Fig. 3 is an enlarged fragmentary section taken on line 3—3 of Fig. 2; Fig. 4 is a section on line 4—4 of Fig. 2; Fig. 5 is an elevation of the dial plate; Fig. 6 is a section on line 6—6 of Fig. 5; Fig. 7 is an elevation of a second plate which covers the dial plate; and Fig. 8 is a section on line 8—8 of Fig. 7.

The layout of Fig. 1 comprises essentially the gauge portion A, a gauge line B, a pump C adapted to force air into the line B to keep the same comparatively filled at all times, and a bell D extending into the liquid contained in the tank E. The gauge comprises a main casting 10 having a base provided with inner and outer shouldered cylindrical seats $10^a$ and $10^b$ and having a threaded portion 11 to which the line B is adapted to be connected and having a cover plate 12 which nearly covers a diaphragm 13 and upon which is mounted the operating mechanism for the pointer 14 and the ears 15, hereinafter described more in detail. The foregoing construction is, with the exception of the ears 15 extending from the plate 12, of conventional construction, and per se forms no part of my invention. Telescoping on the casting 10 of the gauge is a shell $18^a$ which slips over the seat $10^b$ and serves to protect the delicate gauge mechanism. The ears 15 which are integral with the plate 12 extend outwardly from said plate and are turned upwardly to form base portions $15^a$, which portions have the ends thereof turned at substantially right angles to form upturned portions $15^b$. A slit is formed in the upturned portion $15^b$ and is positioned at the lowest point thereon, that is, the lower edge of the slit is continuous with the base portions $15^a$ whereby the resilient plates 16 and 17 may rest on the base portions $15^a$ and extend through the slits. It will be obvious that the slits should be just wide enough to receive the plates and hold the same against the base portions $15^a$. It will be observed from the drawings that the base portions $15^a$ conform to the arc of a circle and that the inherent resiliency of the plates 16 and 17, normally straight, will tend to press the same against the base portion and prevent any rattling. As is best seen in Fig. 2, the ears 15 have the slits positioned so as to hold the plates 16 and 17 spaced from the wall of the inner casing $16^a$ whereby a sufficient space is left for the pointer 14 to extend therebetween. The pointer 14, see Fig. 4, is bent at right angles and has a portion extending across the dial or plates 16 and 17 in close proximity thereto, having an upwardly bent portion $14^a$ to conform to the rib $16^a$ in the plate 16. The outer surface of the plate $16^a$ is to be enameled or otherwise suitably colored in distinctive transparent brilliant colors. The plate 17 is to be enameled or painted a metallic or silver or other suitable contrasting color so that the rib $16^a$ presents the appearance of a column of liquid such as is employed in gauges of the manometer type. The pointer in the region $14^a$ will be enameled or painted a color contrasting with that of the rib $16^a$. The pointer may have the same color entirely across, or merely a small portion of the region $14^a$ which is adjacent the rib $16^a$ may have the contrasting color and the remainder may, if desired, have the same color as the plate 17. In practice I prefer this region of the pointer to be white to give the impression of a break in a liquid column. It will, of course, be understood, as is clearly seen from Figs. 5 and 7, that the plates 16 and 17 have extensions 16^b and 17^b at the ends which are received in the slits in the upturned portions 15^b.

An outer casing 18 is slipped over the inner casing 18^a and over the seat 10^a and is suitably secured to the gauge casting 10. This outer casing is provided with suitable windows 19 through which light may be admitted for illuminating the dial, and has upturned portions 20 for securing a cover frame 21 which holds a glass window 22 in position. It will be seen that the glass 22 bears against a small washer 23 which, in turn bears on a stamping 24 which is held in position by having its rear portion in engagement with the front edge of the inner casing 18^a. The stamping 24 has a slot 25 therein through which the rib 16^a is visible.

From the foregoing, it will be apparent that I have provided a gauge which is well suited for its intended purposes, in which a superior construction is embodied, and which is capable of being manufactured at a low cost.

While my invention resides in details of construction and arrangement of parts, it is nevertheless susceptible of being carried into effect in a number of variant forms, and I wish it understood that I am limited only in accordance with the appended claims.

Having thus described my invention, what I claim is:—

1. In a recording gauge, the combination of a plate having a rib thereon, and a second plate superposed upon said first plate, said second plate having a color contrasting with that of said first plate and a slot through which said rib extends, said slot being of such size that substantially only said rib is visible therethrough.

2. In a recording gauge, the combination of a plate having a rib thereon, a second plate superposed upon said first plate, said second plate having a color contrasting with that of said first plate and a slot through which said rib extends, and a pointer having a portion extending in front of said rib and having a color in the region adjacent said rib contrasting with the color thereof.

3. In a recording gauge, the combination of a plate having a rib thereon, a second plate superposed upon said first plate, said second plate having a color contrasting with that of said first plate and a slot through which said rib extends, and a pointer having a portion extending in front of said rib and having a color in the region adjacent said rib contrasting with the color thereof and said pointer being curved in the region of said rib whereby it may be close to said rib and said second plate.

4. In a recording gauge, a gauge mechanism, a pointer carried thereon and controlled thereby, ears carried by said gauge mechanism and each having a base portion and an upturned portion and a slit in said upturned portion adjacent said base.

5. In a recording gauge, a gauge mechanism, a pointer carried thereon and controlled thereby, ears carried by said gauge mechanism and each having a base portion and an upturned portion and a slit in said upturned portion adjacent said base, a plate having a rib thereon, and a second plate superposed upon said first plate, said second plate having a color contrasting with that of said first plate and a slot through which said rib extends, said first plate resting on said base portion and said second plate having portions cooperating with said slits to secure said plates in position on said base portions.

6. In a recording gauge, a gauge mechanism, a pointer carried thereon and controlled thereby, ears carried by said gauge mechanism and each having a base portion and an upturned portion and a slit in said upturned portion adjacent said base, a plate having a rib thereon, and a second plate superposed upon said first plate, said second plate having a color contrasting with that of said first plate and a slot through which said rib extends, said slot being of such a size that substantially only said rib is visible therethrough, said first plate resting on said base portion and said second plate having portions cooperating with said slits to secure said plates in position on said base portions.

7. In a recording gauge, a gauge mechanism, a pointer carried thereon and controlled thereby, ears carried by said gauge mechanism and each having a base portion and an upturned portion and a slit in said upturned portion adjacent said base, a plate having a rib thereon, and a second plate superposed upon said first plate, said second plate having a color contrasting with that of said first plate and a slot through which said rib extends, and a pointer having a portion extending in front of said rib and having a color in the region adjacent said rib contrasting with the color thereof, said first plate resting on said base portion and said second plate having portions cooperating with said slits to secure said plates in position on said base portions.

8. In a recording gauge, a gauge mechanism, a pointer carried thereon and controlled thereby, ears carried by said gauge mechanism and each having a base portion and an upturned portion and a slit in said upturned portion adjacent said base, a plate having a rib thereon, and a second plate superposed upon said first plate, said second plate having a color contrasting with that of said first plate and a slot through which said rib extends, and a pointer having a portion extending in front of said rib and having a color in the region adjacent said rib contrasting with the color thereof, and said pointer being curved in the region of said rib whereby it may be close to said rib and said second plate, said first plate resting on said base portion and said second plate having portions cooperating with said slits to secure said plates in position on said base portions.

In testimony whereof, I hereunto affix my signature.

DAVID BENJAMIN.